US008244080B2

(12) United States Patent
Shibata et al.

(10) Patent No.: US 8,244,080 B2
(45) Date of Patent: Aug. 14, 2012

(54) METHOD FOR PRODUCING PHOTOELECTRIC COMPOSITE SUBSTRATE, PHOTOELECTRIC COMPOSITE SUBSTRATE PRODUCED BY THE METHOD, AND PHOTOELECTRIC COMPOSITE MODULE USING THE SUBSTRATE

(75) Inventors: Tomoaki Shibata, Ibaraki (JP); Hiroshi Masuda, Ibaraki (JP); Atsushi Takahashi, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 295 days.

(21) Appl. No.: 12/597,534

(22) PCT Filed: Apr. 18, 2008

(86) PCT No.: PCT/JP2008/057616
§ 371 (c)(1),
(2), (4) Date: Oct. 26, 2009

(87) PCT Pub. No.: WO2008/136285
PCT Pub. Date: Nov. 13, 2008

(65) Prior Publication Data
US 2010/0119191 A1 May 13, 2010

(30) Foreign Application Priority Data

Apr. 27, 2007 (JP) .................................. 2007-119538
Aug. 6, 2007 (JP) .................................. 2007-204365
Sep. 7, 2007 (JP) .................................. 2007-233295

(51) Int. Cl.
*G02B 6/12* (2006.01)

(52) U.S. Cl. ........................................................ 385/14
(58) Field of Classification Search .................. None
See application file for complete search history.

(56) References Cited

U.S. PATENT DOCUMENTS

| 2005/0201707 | A1* | 9/2005 | Glebov et al. ................. 385/132 |
| 2005/0224946 | A1* | 10/2005 | Dutta ............................ 257/686 |
| 2008/0187267 | A1* | 8/2008 | Anzures et al. ................. 385/14 |
| 2010/0129045 | A1* | 5/2010 | Shibata et al. ................. 385/141 |

FOREIGN PATENT DOCUMENTS

| JP | 2001-7461 | 1/2001 |
| JP | 2001-166165 | 6/2001 |
| JP | 2006-11210 | 1/2006 |
| JP | 2006-22317 | 1/2006 |
| JP | 2006-39390 | 2/2006 |
| JP | 2006-84488 | 3/2006 |
| JP | 2006-91500 | 4/2006 |
| JP | 2007-108228 | 4/2007 |

* cited by examiner

*Primary Examiner* — Sung Pak
(74) *Attorney, Agent, or Firm* — Antonelli, Terry Stout & Kraus, LLP.

(57) ABSTRACT

The present invention provides a production process for a photoelectric composite substrate having an excellent productivity, comprising a step in which a sheet-like adhesive is stuck to an optical waveguide, a step in which a supporting base material of the above sheet-like adhesive is peeled off to prepare the optical waveguide provided with the adhesive, a step in which the above optical waveguide provided with the adhesive is adhered to an electric wiring board to prepare the electric wiring board provided with the optical waveguide and a step in which an optical path conversion mirror is formed in the optical waveguide of the above electric wiring board provided with the optical waveguide, a photoelectric composite substrate produced by using the above production process and a photoelectric composite module produced by using the above photoelectric composite substrate.

7 Claims, 5 Drawing Sheets

(a)

(b)

(c)

(d)

(e)

(f)

METHOD FOR PRODUCING PHOTOELECTRIC COMPOSITE SUBSTRATE, PHOTOELECTRIC COMPOSITE SUBSTRATE PRODUCED BY THE METHOD, AND PHOTOELECTRIC COMPOSITE MODULE USING THE SUBSTRATE

BACKGROUND OF THE INVENTION

The present invention relates to a production process for a photoelectric composite substrate, a photoelectric composite substrate produced by the same and a photoelectric composite module prepared by using the same.

RELATED ART

In high speed and high density signal transmission between electronic devices and between wiring boards, it is observed that transmission through conventional electric wirings is restricted in a rise in a speed and a density due to barriers brought about by mutual interference and attenuation of signals. In order to break through such restrictions, proposed is a technology of connecting electronic devices and wiring boards with each other by means of light, so-called optical interconnection, and various investigations regarding combination of electrical wiring with optical wiring are carried out. In particular, optical wiring is tried to be introduced into a hinge part of portable phones and note type personal computers in recent years, and a flexible photoelectric composite substrate having a flexibility is used in the above applications.

In respect to combination of electrical wiring with optical wiring, proposed is a method in which a semiconductor chip is adhered, as described in a patent document 1, to an optical waveguide via an adhesive sheet. In the above method, however, dividing of the optical waveguide and cutting of the adhesive sheet are different steps from each other, and therefore the problem that assembling is troublesome has been involved therein.

In the step of dividing an optical waveguide described above, the optical waveguide is processed to a form provided with a mirror for converting an optical path, and the optical waveguide equipped with a mirror is positioned on an electric wiring board or a sub-mount and adhered thereon, whereby a photoelectric composite substrate or a photoelectric composite module can be prepared. A method in which an optical waveguide equipped with a mirror is adhered on a sub-mount of an Si substrate by using an adhesive is shown in, for example, a patent document 2. In the above method, however, the mirror position is varied to a large extent due to a dimensional change brought about by expansion and contraction of the substrate, the optical waveguide and the adhesive in heating and curing the adhesive, and it is concerned that an optical coupling efficiency between the light-sensitive and light emitting elements and the optical waveguide is reduced.

Patent document 1: Japanese Patent Application Laid-Open No. 39390/2006
Patent document 2: Japanese Patent Application Laid-Open No. 11210/2006

DISCLOSURE OF THE INVENTION

In light of the problems of the conventional techniques described above, an object of the present invention is to provide a production process for a photoelectric composite substrate which is excellent in a productivity, a photoelectric composite substrate produced by the same and a photoelectric composite module prepared by using the same.

Intensive investigations repeated by the present inventors have resulted in finding that the problems described above can be solved by sticking a sheet-like adhesive to an optical waveguide and adhering the above optical waveguide provided with the adhesive to an electric wiring board to form an optical path conversion mirror in the optical waveguide of the electric wiring board provided with the optical waveguide.

That is, the present invention provides:

(1) a production process for a photoelectric composite substrate, comprising a first step in which an optical waveguide is stuck to a sheet-like adhesive, a second step in which a supporting base material of the above sheet-like adhesive is peeled off to prepare the optical waveguide provided with the adhesive, a third step in which the above optical waveguide provided with the adhesive is adhered to an electric wiring board to prepare the electric wiring board provided with the optical waveguide and a fourth step in which an optical path conversion mirror is formed in the optical waveguide of the above electric wiring board provided with the optical waveguide, (2) a photoelectric composite substrate produced by the production process as described in the above item (1) and (3) a photoelectric composite module produced by using the photoelectric composite substrate as described in the above item (2).

According to the present invention, a photoelectric composite substrate can readily be produced, and the photoelectric composite substrate obtained makes it possible to connect light-sensitive and light emitting elements with an optical waveguide at a high accuracy and obtain a high optical coupling efficiency.

BRIEF EXPLANATIONS OF THE DRAWINGS

FIG. 1 is a conceptual drawing showing one example of the production process for a photoelectric composite substrate according to the present invention. In FIG. 1, (a) to (f) are drawings for explaining the respective steps of (a) sticking a sheet-like adhesive, (b) dividing an optical waveguide, (c) peeling off a supporting base material, (d) adhering onto an electric circuit board, (e) forming an optical path conversion mirror and (f) mounting an optical element, wherein the respective left drawings of (a) to (d) and (f) are cross sections of a width direction, and the respective right drawings of (a) to (d) and (f) and (e) are lateral views of a longitudinal direction.

Figure 5:
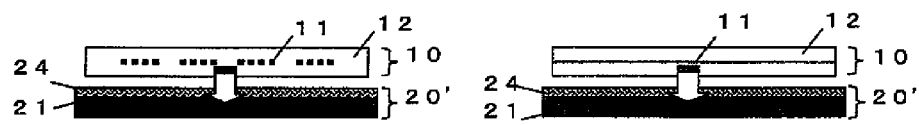
Figure 5:
Figure 5:
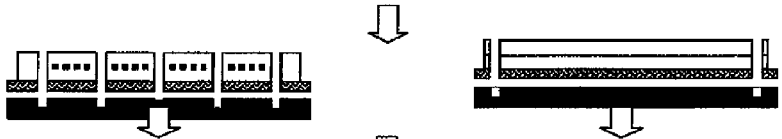
Figure 5:
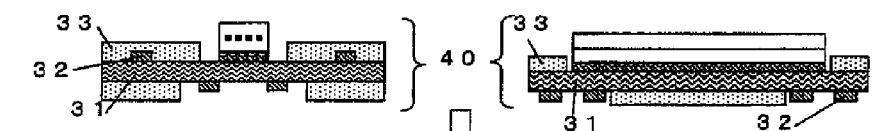
Figure 5:
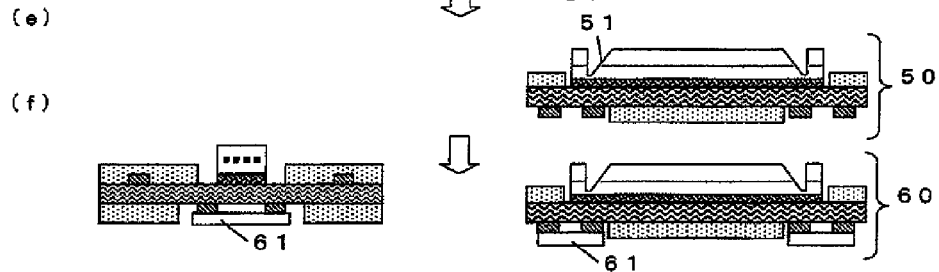

FIG. 5 is a drawing showing another one example of the production process for a photoelectric composite substrate according to the present invention. In FIG. 5, (a) to (f) are drawings for explaining the respective steps of (a) sticking a sheet-like adhesive, (b) dividing an optical waveguide, (c) peeling off a supporting base material, (d) adhering onto an electric circuit board, (e) forming an optical path conversion mirror and (f) mounting an optical element, wherein the respective left drawings of (a) to (d) and (f) are cross sections of a width direction, and the respective right drawings of (a) to (d) and (f) and (e) are lateral views of a longitudinal direction.

Figure 6:
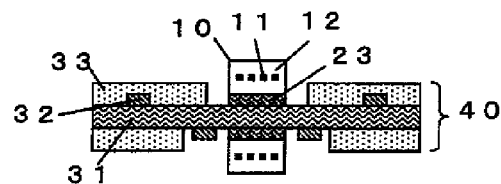

FIG. 6 is a drawing showing different one example of the photoelectric composite substrate of the present invention.

Figure 7:
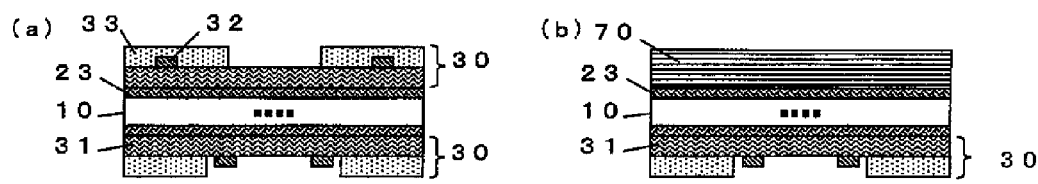

FIG. 7 is a drawing showing another one example of the photoelectric composite substrate of the present invention.

Figure 8:
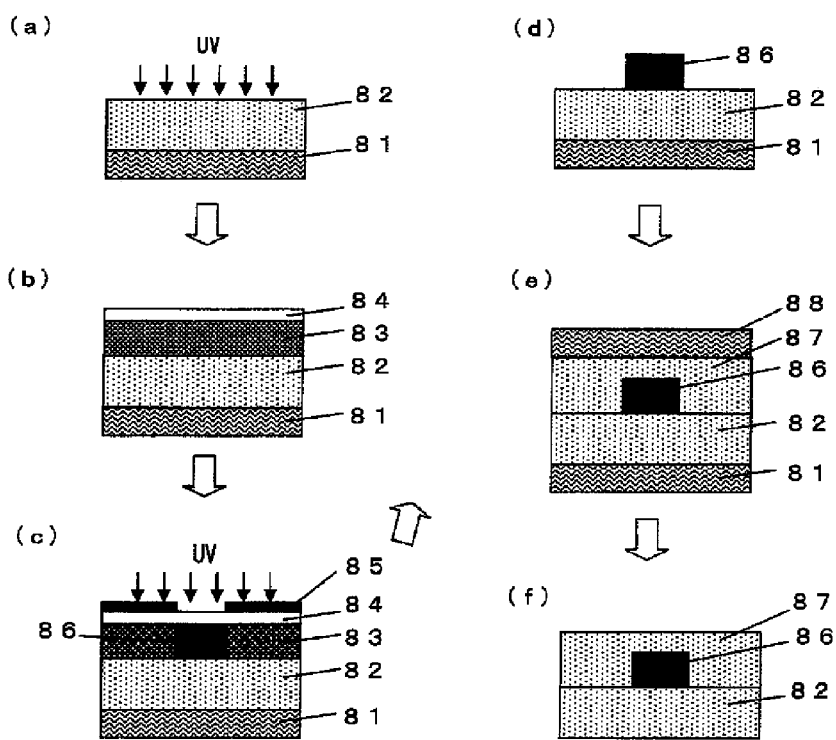

FIG. 8 is a drawing explaining the production process for the optical waveguide used in the present invention. In FIG. 8, (a) to (f) are drawings for explaining the respective steps of (a) curing a lower cladding layer, (b) laminating a resin film for forming a core layer, (c) exposing, (d) developing, (e) laminating and curing an upper cladding layer and (f) peeling off a base material film.

Figure 9:
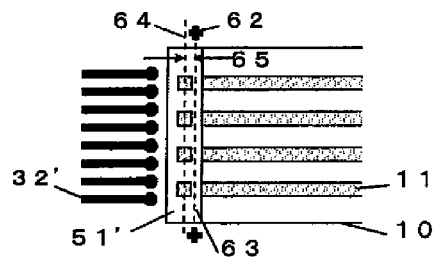

FIG. 9 is a drawing explaining a positional displacement amount of the mirror of the photoelectric composite substrate.

Figure 10:
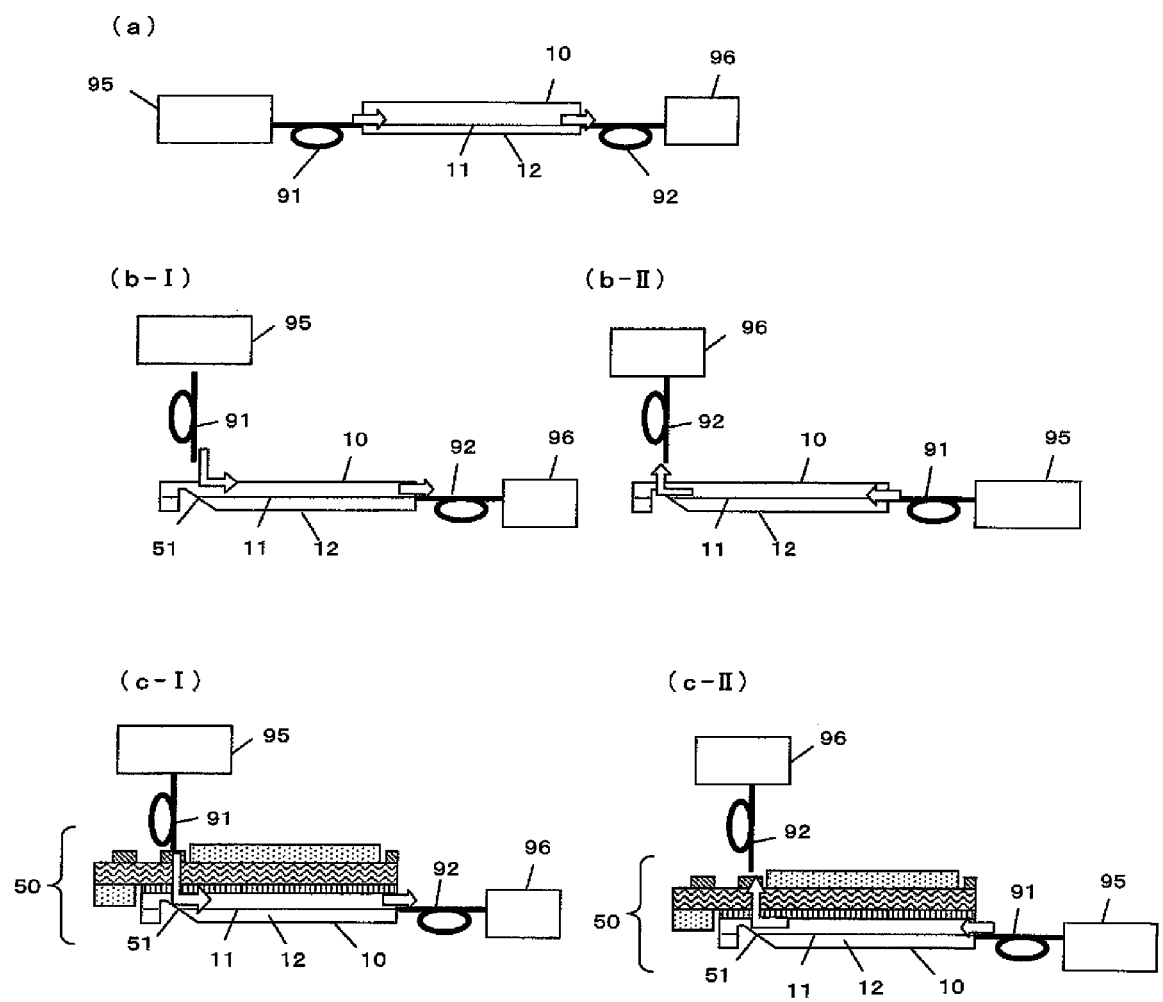

FIG. 10 is a drawing explaining a method for evaluating an optical loss of the photoelectric composite substrate. In FIG. 10, (a) is a drawing explaining a method for evaluating an optical loss of a flexible optical waveguide, and (b-I) and (b-II) each are drawings explaining a method for evaluating an incident loss and an output loss of the optical waveguide.

Figure 11:
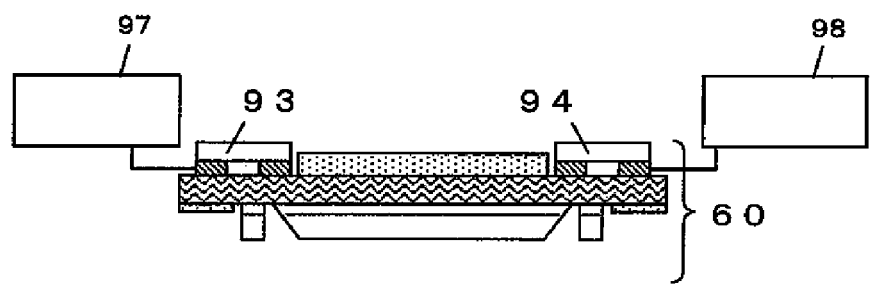

FIG. 11 is a drawing explaining a method for evaluating optical signal transmission of the photoelectric composite substrate.

Figure 12:
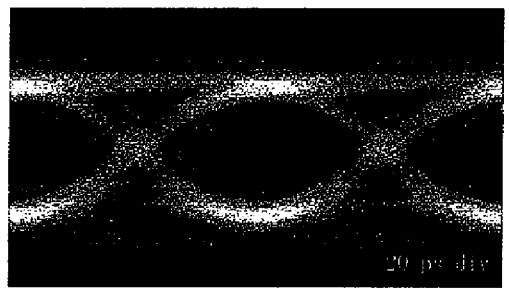

FIG. 12 is a measuring result of an eye pattern of the photoelectric composite substrate in 10 Gbps transmission.

Figure 13:
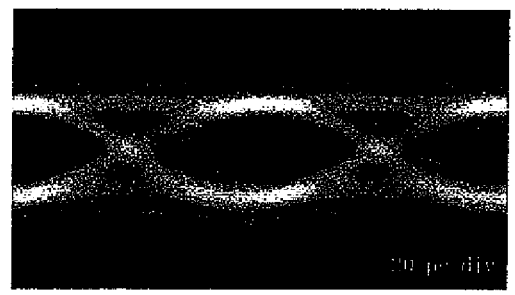

FIG. 13 is a measuring result of an eye pattern of the photoelectric composite substrate in 10 Gbps transmission in a state in which the photoelectric composite substrate is bent by 360° at a curvature radius of 1.5 mm.

EXPLANATION of CODES

10: Optical waveguide
11: Core pattern
12: Cladding layer
20, 20': Sheet-like adhesives
21: Supporting base material
22: Pressure-sensitive adhesive layer
23: Adhesive layer
24: Pressure-sensitive adhesive and adhesive layer
25: Protective film
30: Electric wiring board
31: Substrate
32: Electric wiring
32': Electric wiring for mounting an optical element
33: Electric insulating layer
40: Electric wiring board equipped with an optical waveguide
50: Photoelectric composite substrate
51: Optical path conversion mirror
51': Optical path conversion mirror (inclined face)
60: Photoelectric composite module
61: Optical element (VCSEL or photodiode)
62: Mirror positioning mark (formed by electric wiring)
63: Center line of mirror positioning mark
64: Center line of optical path conversion mirror
65: Mirror position displacement amount
70: Cover film
81: Base material film for cladding layer
82: Lower cladding layer
83: Core layer
84: Base material film for core layer
85: Photomask
86: Core pattern
87: Upper cladding layer
88: Base material film for cladding layer
91: Incident fiber (GI-50/125 multimode fiber)
92: Output fiber (GI-62.5/125 multimode fiber)
93: 4 ch-VCSEL array
94: 4 ch-PD array
95: VCSEL
96: PD
97: Pulse pattern generator
98: Oscilloscope

BEST MODE FOR CARRYING OUT THE INVENTION

The production process for a photoelectric composite substrate according to the present invention is characterized by comprising a first step in which an optical waveguide is stuck to a sheet-like adhesive, a second step in which a supporting base material of the above sheet-like adhesive is peeled off to prepare the optical waveguide provided with the adhesive, a third step in which the above optical waveguide provided with the adhesive is adhered to an electric wiring board to prepare the electric wiring board provided with the optical waveguide and a fourth step in which an optical path conversion mirror is formed in the optical waveguide of the above electric wiring board provided with the optical waveguide. The respective steps shall be described below in details while referring to FIG. 1 to FIG. 5.

Figure 1:
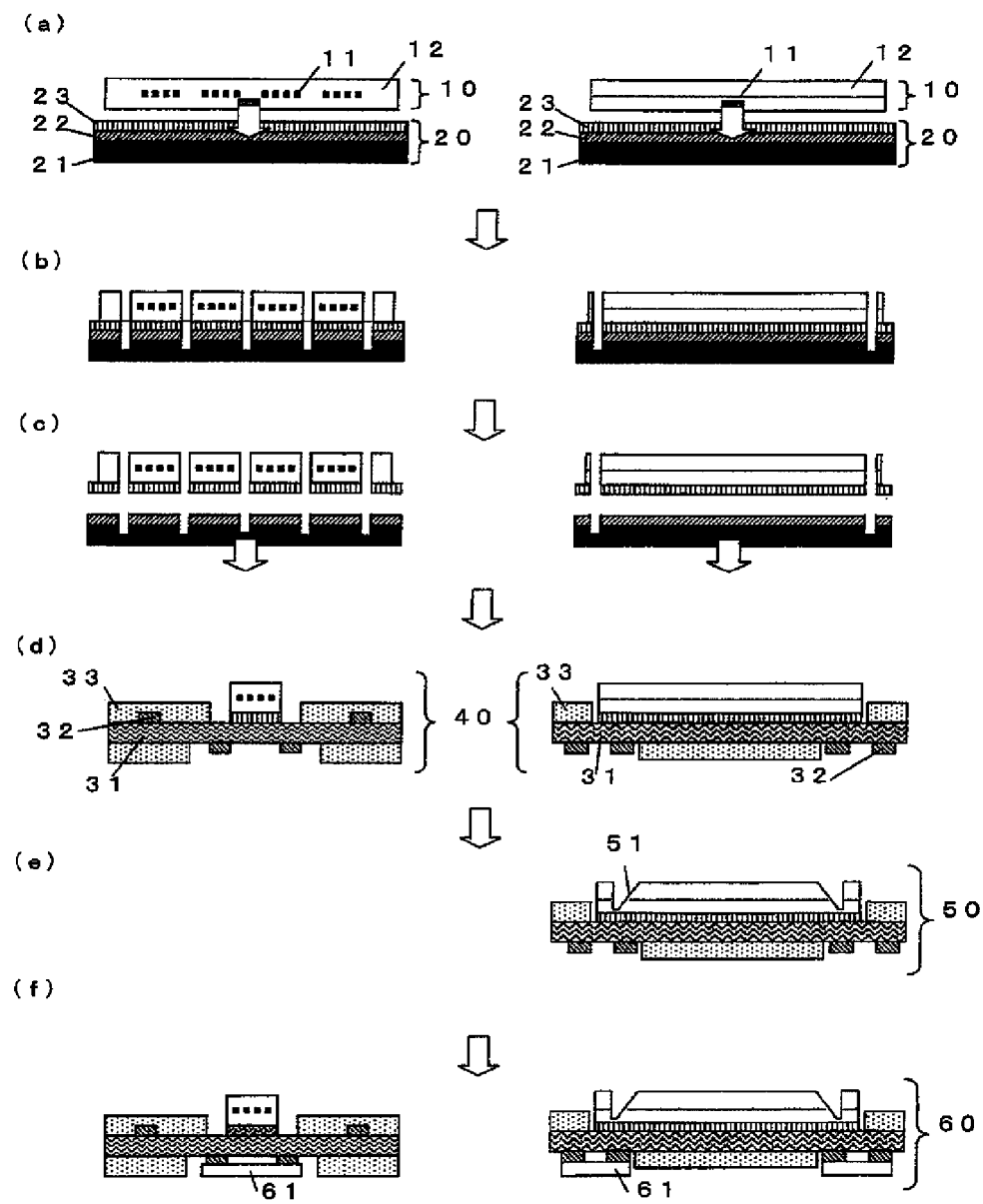

The first step in the production process of the present invention is a step in which an optical waveguide 10 is stuck to a sheet-like adhesive 20 (refer to FIG. 1 (a)). In this regard, the optical waveguide shall not specifically be restricted as long as it controls transmission, branching, reflection, refraction, amplification and attenuation of light, and it is constituted usually from a core having a high refractive index and a clad having a low refractive index which covers the core.

In the present invention, a polymer optical waveguide having a flexibility is suitably used from the viewpoint that a flexible photoelectric composite substrate having a flexibility can be produced.

Figure 2:
FIG. 2 is a drawing showing one example of the sheet-like adhesive used in the present invention.

The sheet-like adhesive used in the present invention may have an adhesive layer directly on a supporting base material, but it has preferably a constitution in which a pressure-sensitive adhesive layer 22 and an adhesive layer 23 are provided in this order, as is the case with a sheet-like adhesive 20 shown in FIG. 2, on a supporting base material 21 in order to readily peel off the adhesive layer from the supporting base material. The supporting base material 21 used in the above case is, as shown in FIG. 1 (a), a supporting base material for sticking the optical waveguide 10, and therefore it has to have a strength to some extent. Further, as described later in details, a supporting base material 21 side is irradiated with a radial ray when an adhesive strength of an interface between the pressure-sensitive adhesive layer 22 and the adhesive layer 23 is reduced by irradiation with a radial ray such as a UV ray and the like, and therefore the supporting base material has to have a transmitting property to the radial ray used. From the viewpoint described above, the supporting base material 21 includes, for example, plastic films such as a polytetrafluoroethylene film, a polyethylene terephthalate film, a polyethylene film, a polypropylene film, a polymethylpentene film, a polyimide film and the like, and among them, a polyethylene terephthalate film and the like are preferred.

A thickness of the base material shall not specifically be restricted as long as the above performances of the supporting base material can be achieved, and it is usually 10 to 200 μm.

From the viewpoint of a storing property of the sheet-like adhesive 20, a protective film 25 may be provided, as shown in FIG. 2, on the adhesive layer 23.

Next, the pressure-sensitive adhesive layer 22 is provided in order to connect the supporting base material with the adhesive layer, and it is constituted by a material having a property in which a pressure-sensitive adhesive strength is reduced by irradiation with a radial ray after stuck on the optical wave guide and in which an adhesive strength of an interface between the pressure-sensitive adhesive layer and the adhesive layer is reduced. To be specific, the above material includes acryl base adhesives having a radial ray-curable carbon-carbon double bond.

A thickness of the pressure-sensitive adhesive layer 22 shall not specifically be restricted as long as the above performances of the pressure-sensitive adhesive layer can be achieved, and it is usually 1 to 100 μm.

Next, an adhesive composition constituting the adhesive layer 23 shall not specifically be restricted as long as the production process described above can be realized, and from the viewpoint of an adhesive property, a heat resistant reliability, a low elasticity, a stress relaxing property, a transparency, a workability and the like, it contains preferably (a) an epoxy resin, (b) a curing agent for an epoxy resin and (c) a high polymer compound having a weight average molecular weight of 100,000 or more. The above sheet-like adhesive includes, for example, adhesives described, in International Publication No. 01/060938.

The epoxy resin (a) shall not specifically be restricted as long as it is cured to exhibit an adhesive action. An epoxy resin which is difunctional or higher and which has a molecular weight of preferably less than 5000, more preferably less than 3000 can be used. Capable of being used are, for example, difunctional epoxy resins such as bisphenol A type epoxy resins, bisphenol F type epoxy resins and the like and novolac type epoxy resins such as phenol novolac type epoxy resins, cresol novolac type epoxy resins and the like. Further, conventionally known epoxy resins such as polyfunctional epoxy resins, heterocycle-containing epoxy resins and the like can be applied as well.

Capable of being used as the above epoxy resins are commercially available epoxy resins including, for example, bisphenol A type epoxy resins such as Epikote 807, Epikote 815, Epikote 825, Epikote 827, Epikote 828, Epikote 834, Epikote 1001, Epikote 1002, Epikote 1003, Epikote 1055, Epikote 1004, Epikote 1004AF, Epikote 1007, Epikote 1009, Epikote 1003F and Epikote 1004F (trade names, manufactured by Japan Epoxy Resins Co., Ltd.), DER-330, DER-301, DER-361, DER-661, DER-662, DER-663U, DER-664, DER-664U, DER-667, DER-642U, DER-672U, DER-673MF, DER-668 and DER-669 (trade names, manufactured by The Dow Chemical Company), YD8125 and YD8170 (trade names, manufactured by Tohto Kasei Co., Ltd.) and the like; bisphenol F type epoxy resins such as YDF-2004 (trade name, manufactured by Tohto Kasei Co., Ltd.) and the like; phenol novolac type epoxy resins such as Epikote 152 and Epikote 154 (trade names, manufactured by Japan Epoxy Resins Co., Ltd.), EPPN-201 (trade name, manufactured by Nippon Kayaku Co., Ltd.), DEN 438 (trade name, manufactured by The Dow Chemical Company) and the like; cresol novolac type epoxy resins such as Epikote 180565 (trade name, manufactured by Japan Epoxy Resins Co., Ltd.), Araldite ECN1273, Araldite ECN1280 and Araldite ECN1299 (trade names, manufactured by Ciba Specialty Chemicals K.K), YDCN-701, YDCN-702, YDCN-703 and YDCN-704 (trade names, manufactured by Tohto Kasei Co., Ltd.), EOCN-1025, EOCN-103S, EOCN-104S, EOCN-1012, EOCN-1020, EOCN-1025 and EOCN-1027 (trade names, manufactured by Nippon Kayaku Co., Ltd.), ESCN-195x, ESCN-200L and ESCN-220 (trade names, manufactured by Sumitomo Chemical Co., Ltd.) and the like; polyfunctional epoxy resins such as Epon 1031S, Epikote 1032H60 and Epikote 157S70 (trade names, manufactured by Japan Epoxy Resins Co., Ltd.), Araldite 0163 (trade name, manufactured by Ciba Specialty Chemicals K.K), Denacol EX-611, Denacol EX-614, Denacol EX-614B, Denacol EX-622, Denacol EX-512, Denacol EX-521, Denacol EX-421, Denacol EX-411 and Denacol EX-321 (trade names, manufactured by Japan Nagase Kasei Co., Ltd.), EPPN 501H and EPPN 502H (trade name, manufactured by Nippon Kayaku Co., Ltd.) and the like; amine type epoxy resins such as Epikote 604 (trade name, manufactured by Japan Epoxy Resins Co., Ltd.), YH-434 (trade name, manufactured by Tohto Kasei Co., Ltd.), TETRAD-X and TETRAD-C (trade names, manufactured by Mitsubishi Gas Chemical Company, Inc.), ELM-120 (trade name, manufactured by Sumitomo Chemical Co., Ltd.) and the like; heterocycle-containing epoxy resins such as Araldite PT801 (trade name, manufactured by Ciba Specialty Chemicals K.K) and the like; and alicyclic epoxy resins such as ERL4234, ERL4299, ERL4221 and ERL4206 (trade names, manufactured by Union Carbide Corporation) and the like. The above epoxy resins can be used alone or in combination of two or more kinds thereof.

In the present invention, an epoxy resin which is a solid matter at room temperature and which has a softening point of 50° C. or higher measured by a ring and ball method is used in a proportion of preferably 20% by mass or more, more preferably 40% by mass or more and particularly preferably 60% by mass or more based on the whole epoxy resin from the viewpoint of a heat resistance. The above epoxy resin includes, for example, bisphenol A type epoxy resins, bisphenol F type epoxy resins, bisphenol S type epoxy resins, alicyclic epoxy resins, aliphatic chain epoxy resins, phenol novolac type epoxy resins, cresol novolac type epoxy resins, bisphenol A novolac type epoxy resins, diglycidyl etherified compounds of biphenol, diglycidyl etherified compounds of naphthalenediol, diglycidyl etherified compounds of phenols, diglycidyl etherified compounds of alcohols and alkyl-substituted matters, halides and hydrogenated products of the above compounds. They may be used alone or in combination of two or more kinds thereof, and components other than the epoxy resins may be contained as impurities.

The curing agent (b) shall not specifically be restricted and can be used as long as it can cure the epoxy resins. The above curing agent includes, for example, polyfunctional phenols, amines, imidazole compounds, acid anhydrides, organic phosphorus compounds and halides thereof, polyamides, polysulfides, boron trifluoride and the like.

The examples of the polyfunctional phenols include hydroquinone, resorcinol and catechol which are monocyclic difunctional phenols, bisphenol A, bisphenol F, bisphenol S, naphthalenediols, biphenols and halides and alkyl-substituted matters thereof which are polycyclic difunctional phenols. Further, they include phenol resins which are polycondensation products of the above phenols with aldehydes such as phenol novolac resins, resole resins, bisphenol A novolac resins, cresol novolac resins and the like. Preferred polyfunctional phenols which are commercially available include, for example, Phenolite LF2882, Phenolite LF2822, Phenolite TD-2090, Phenolite TD-2149, Phenolite VH4150 and Phenolite VH4170 (trade names, manufactured by Dainippon Ink & Chemicals Inc.).

In the present invention, a phenol resin having a hydroxyl equivalent of 150 g/eq or more is preferably used. The above phenol resin shall not specifically be restricted as long as it has the value described above, and the resin of a novolac type or a cresol type is preferably used because of an excellent electric corrosion resistance in absorbing moisture.

The above curing agents can be used alone or in combination. A blending amount of the above curing agents shall not specifically be restricted as long as they can allow a curing reaction of the epoxy group to proceed, and it is used in a range of preferably 0.01 to 5.0 equivalent, particularly preferably 0.8 to 1.2 equivalent per mole of the epoxy group.

The high polymer compound (c) having a weight average molecular weight of 100,000 or more includes, for example, acryl base copolymers, particularly rubbers such as acryl rubber; silicone resins; silicone-modified resins such as silicone-modified polyamideimide and the like.

The component (c) containing a reactive group (functional group) and having a weight average molecular weight of 100,000 or more is preferred. The reactive group includes, for example, a carboxylic acid group, an amino group, a hydroxyl group, an epoxy group and the like. If the functional group monomer is acrylic acid of a carboxylic acid type among them, cross-linking reaction is liable to proceed, and the adhesive strength is reduced in a certain case due to gelation in a varnish state and a rise in the curing degree in a B stage state (semi-cured state). Accordingly, glycidyl acrylate or glycidyl methacrylate having an epoxy group which does not bring about the above matters or is extended in a period thereof if bringing about them is more preferably used. An epoxy group-containing acryl copolymer having a weight average molecular weight of 100,000 or more is further preferably used as the component (c). The component (c) is obtained by carrying out polymerization so that the unreacted monomers remain in polymerization reaction for obtaining the high polymer compound or can be obtained as well by adding a reactive group-containing monomer after obtaining the high polymer compound.

The weight average molecular weight is a styrene-reduced value obtained by using a calibration curve prepared with standard polystyrene by a gel permeation chromatographic (GPC) method.

The acryl base copolymer which is the preferred mode of the component (c) includes, for example, acryl rubbers which are copolymers of acrylic esters, methacrylic esters, acrylonitrile and the like. Also, the acryl base copolymers containing 0.5 to 6% by mass of glycidyl acrylate or glycidyl methacrylate as a functional group monomer and having a glass transition temperature (hereinafter abbreviated as Tg) of −50° C. or higher and 30° C. or lower, preferably −10° C. or higher and 30° C. or lower and a weight average molecular weight of 100,000 or more are particularly preferred since an adhesive property and a heat resistance are high. The acryl copolymers (hereinafter referred to as "the epoxy group-containing acryl copolymers") containing 0.5 to 6% by mass of glycidyl acrylate or glycidyl methacrylate and having Tg of −10° C. or higher and a weight average molecular weight of 100,000 or more include, for example, HTR-860P-3 (trade name, manufactured by Teikoku Chemical Industry Co., Ltd.). An amount of glycidyl acrylate or glycidyl methacrylate used as a functional group monomer is more preferably 2 to 6% by mass in terms of a copolymer ratio. If it is 2% by mass or more, the high adhesive strength can be obtained. If it is 6% by mass or less, the gelation is not brought about, and it is preferred.

Alkyl acrylates and alkyl methacrylates having an alkyl group having 1 to 8 carbon atoms such as methyl acrylate, methyl methacrylate and the like and a mixture of styrene, acrylonitrile and the like can be used as the balance. Among them, ethyl(meth)acrylate and/or butyl(meth)acrylate are particularly preferred.

The mixing proportion is preferably controlled considering Tg of the copolymer. If Tg is 10° C. or higher, a tackiness of the adhesive layer in a B stage state is prevented from being too large, and the good handling property can be maintained.

The polymerization method shall not specifically be restricted and includes, for example, pearl polymerization, solution polymerization and the like, and the copolymer is obtained by the above methods.

A weight average molecular weight of the epoxy group-containing acryl copolymer is preferably 300,000 to 3,000,000, more preferably 500,000 to 2,000,000. If the weight average molecular weight is 300,000 or more, the sufficiently high strength and the sufficiently high flexibility in the forms of a sheet and a film are obtained, and the tackiness is prevented from growing large. On the other hand, if it is 3,000,000 or less, the sufficiently high flow property is obtained, and a circuit filling property of the wiring is prevented from being reduced.

A reduction in the elastic modulus and an inhibition of the flow property in molding are possible according to an addition amount of the high polymer compound (C), and therefore assuming that a total mass of the epoxy resin (a) and the curing agent (b) is set to A and that a mass of the high polymer compound (c) which is non-compatible with the epoxy resin is set to B, a ratio A/B thereof is preferably 0.24 to 1.0. If A/B is 0.24 or more, a reduction in the elastic modulus and an inhibiting effect of the flow property in molding are sufficiently obtained. On the other hand, if it is 1.0 or less, the handling property at high temperature is good.

A filler, a curing accelerating agent, a coupling agent and the like can further be added to the adhesive composition constituting the adhesive layer used in the present invention as long as the transparency is not damaged.

Also, a thickness of the adhesive layer is preferably 5 to 50 μm. If it is 5 μm or more, the layer can readily be coated in an even thickness, and the effect of sufficiently high stress relaxation is obtained. On the other hand, if it is 50 μm or less, the photoelectric composite substrate can sufficiently be reduced in a thickness, and the optical loss can be reduced since the optical element is close to the optical waveguide in a distance. Further, from the viewpoint of securing the transmission factor, the thickness is preferably 50 μm or less. From the above viewpoints, a thickness of the adhesive layer is more preferably 7 to 25 μm, further preferably 10 to 20 μm.

A method for sticking the sheet-like adhesive to the optical waveguide in the first step is preferably a method carried out by using a roll laminator or a flat plate laminator from the viewpoints of the adhesion and prevention of introducing air bubbles.

A lamination temperature of the roll laminator falls preferably in a range of room temperature (25° C.) to 100° C. If it is room temperature (25° C.) or higher, the adhesive property to the optical waveguide is enhanced. On the other hand, if it is 100° C. or lower, the adhesive layer is prevented from flowing, and the required thickness is obtained. From the viewpoints described above, it falls more preferably in a range of 40 to 100° C. The pressure is preferably 0.2 to 1.0 MPa (1 to 10 kgf/cm$^2$), and the lamination speed is preferably 0.1 to 3 m/minute. However, the above conditions shall not specifically be restricted.

The flat plate laminator shows a laminator in which lamination materials are interposed between a pair of flat plates and bonded by applying pressure to the flat plates, and a vacuum, pressure laminator can suitably be used. In this case, the heating temperature is preferably 50 to 100° C., and the pressing pressure is preferably 0.1 to 1.0 MPa (1 to 10 kgf/cm$^2$). However, the above conditions shall not specifically be restricted.

The present invention is characterized by using the sheet-like adhesive. Use of the sheet-like adhesive makes it possible to secure an accuracy of a thickness of the adhesive and achieve an enhance in the productivity.

In the production process of the present invention, a step in which the optical circuit board is divided may be provided, as shown in FIG. 1 (b), after the first step. The above division is carried out usually by using a cutting processing such as dicing and the like and a punching processing such as punching. In the following explanations, the divided optical circuit board shall be explained as an example thereof.

The second step in the production process of the present invention is a step in which the supporting base material is peeled off from the sheet-like adhesive stuck to the optical waveguide in the first step (refer to FIG. 1 (c)). When the adhesive in which the pressure-sensitive adhesive layer 22 and the adhesive layer 23 are provided in this order on the supporting base material 21 as described above is used as the sheet-like adhesive, an adhesive strength of an interface between the pressure-sensitive adhesive layer 22 and the adhesive layer 23 is reduced, and the supporting base material 21 is peeled off at the above interface to prepare the optical waveguide provided with the adhesive. A method therefor includes methods such as irradiation with a radial ray, curing by heating and the like, and a method in which a supporting base material side is irradiated with an actinic ray in order to selectively cure only the radial ray-curable adhesive layer to cure the adhesive layer is usually employed. In this case, a light source for the actinic ray suitably includes, for example, publicly known light sources effectively radiating a UV ray, such as a carbon arc lamp, a mercury vapor lamp, a ultrahigh pressure mercury lamp, a high pressure mercury lamp, a xenon lamp and the like.

Figure 3:
FIG. 3 is a drawing showing another one example of the sheet-like adhesive used in the present invention.

In the present invention, a sheet-like adhesive 20' having a pressure-sensitive adhesive and adhesive layer 24 on the supporting base material 21 as shown in FIG. 3 can be used as well in place of the sheet-like adhesive having the adhesive layer on the supporting base material described above or the sheet-like adhesive having the pressure-sensitive adhesive layer and the adhesive layer in this order on the supporting base material described above. In this connection, the pressure-sensitive adhesive and adhesive layer shows a layer having a property provided with both functions of the pressure-sensitive adhesive layer and the adhesive layer each described above. Incidentally, a protective layer 25 may be provided, as shown in FIG. 3, on the pressure-sensitive adhesive and adhesive layer 24.

When the pressure-sensitive adhesive and adhesive layer is used, an adhesive strength of an interface between the pressure-sensitive adhesive and adhesive layer and the supporting base material is reduced, and the supporting base material is peeled off at the above interface. When the sheet-like adhesive having the above pressure-sensitive adhesive and adhesive layer is used, the adhesive layer and the pressure-sensitive adhesive and adhesive layer do not have to be provided separately, and therefore a preparing step for the sheet-like adhesive is more simplified.

In respect to the pressure-sensitive adhesive and adhesive layer 24 described above, a pressure-sensitive adhesive and adhesive composition constituting the above pressure-sensitive adhesive and adhesive layer shall not specifically be restricted as long as the production process described above can be realized, and from the viewpoints of having functions required to the pressure-sensitive adhesive and adhesive layer and obtaining an adhesive property, a heat resistant reliability, a low elasticity, a stress relaxing property, a transparency, a workability and the like, it contains preferably (a) an epoxy resin, (b) a curing agent for an epoxy resin, (c) a high polymer compound having a weight average molecular weight of 100,000 or more, (d) an photo reactive monomer and (e) a photoinitiator generating a base and a radical by irradiation with a UV ray. The above sheet-like adhesive includes, for example, adhesives described in International Publication No. 05/112091.

In the above case, the same compounds as described above can be used for the components (a) to (c).

The specific examples of the photo reactive monomer (d) include, for example, polyfunctional acrylates such as pentaerythritol acrylate, dipentaerythritol hexaacrylate, dipentaerythritol pentaacrylate, trimethylolpropane triacrylate, isocyanuric acid EO-modified triacrylate, ditrimethylolpropane tetraacrylate, pentaerythritol tetraacrylate and the like. The above photo reactive monomers can be used alone or in combination of two or more kinds thereof. From the viewpoint of the residual monomers after irradiated with a UV ray, dipentaerythritol hexaacrylate, dipentaerythritol pentaacrylate and the like are particularly preferred. To be specific, A-DPH (dipentaerythritol hexaacrylate) and A-9300 (ethoxylated isocyanuric acid triacrylate) each manufactured by Shin-Nakamura Chemical Co., Ltd. are available.

A use amount of the component (d) is preferably 5 to 100 parts by mass based on 100 parts by mass of the high polymer compound (c) having a weight average molecular weight of 100,000 or more. If the use amount is 5 parts by mass or more, a polymerization reaction of the photo reactive monomer is liable to be caused by irradiation with a UV ray, and therefore the adhesive layer is liable to be peeled off from the supporting base material in the second step described above. On the other hand, if it is 100 parts by mass or less, a sufficiently low elasticity of the high polymer component is maintained, and the film is prevented from being fragile. Further, the moisture resistance and the electrical characteristics at high temperature are sufficiently obtained. From the viewpoints described above, a blend amount of the component (d) is more preferably 10 to 70 parts by mass, particularly preferably 20 to 50 parts by mass.

The photoinitiator generating a base and a radical (e) by irradiation with a UV ray (hereinafter referred to as "the optical base generator") is called usually an α-aminoketone compound, and capable of being used are, for example, 2-methyl-1-[4-(methylthio)phenyl]-2-morpholinopropane-1-one ("Irgacure 907", manufactured by Ciba Specialty Chemicals K.K), 2-benzyl-2-dimethylamino-1-(4-morpholinophenyl)-butanone-1-one ("Irgacure 369", manufactured by Ciba Specialty Chemicals K.K), hexaarylbisimidazole derivatives (the phenyl group may be substituted with substituents such as halogen, an alkoxy group, a nitro group, a cyano group and the like), benzoisooxazolone derivatives and the like.

A low polymer compound having a molecular weight of 500 or less is preferably used as the optical base generator described above, and a compound obtained by introducing the α-aminoketone compound described above into a principal chain and a side chain of the high polymer compound (c) having a weight average molecular weight of 100,000 or more may be used. In this case, the molecular weight is preferably 1000 to 100000, more preferably 5000 to 30000 in terms of a weight average molecular weight from the viewpoint of a pressure-sensitive adhesive and adhesive property and a fluidity of the pressure-sensitive adhesive and adhesive.

In the sheet-like adhesive having the pressure-sensitive adhesive and adhesive layer, a use amount of the optical base generator (e) is preferably 0.1 to 20 parts by mass based on 100 parts by mass of the high polymer compound (c) having a weight average molecular weight of 100,000 or more. If the use amount is 0.1 part by mass or more, the sufficiently high reactivity is obtained, and the residual monomer is prevented from remaining. On the other hand, if it is 20 parts by mass or less, the polymerization reaction sufficiently proceeds to decrease low molecular components, and the good reflow resistance is secured. Accordingly, a use amount of the optical base generator (e) is more preferably 0.5 to 15 parts by mass, further preferably 1 to 5 parts by mass.

Further, a filler, a curing accelerating agent, a coupling agent and the like can be added to the pressure-sensitive adhesive and adhesive composition constituting the pressure-sensitive adhesive and adhesive layer as long as the transparency is not damaged.

A thickness of the pressure-sensitive adhesive and adhesive layer is preferably 5 to 50 μm. If it is 5 μm or more, the layer can readily be coated in an even thickness, and the effect of sufficiently high stress relaxation is obtained. On the other hand, if it is 50 μm or less, the photoelectric composite substrate can sufficiently be reduced in a thickness, and the optical loss can be reduced since the optical element is close to the optical waveguide in a distance. Further, from the viewpoint of securing the transmission factor, the thickness is preferably 50 μm or less. From the above viewpoints, a thickness of the pressure-sensitive adhesive and adhesive layer is more preferably 7 to 25 μm, further preferably 10 to 20 μm.

The third step in the production process of the present invention is a step in which the optical waveguide provided with the adhesive obtained in the second step is adhered onto an electric wiring board (refer to FIG. 1 (d)). The optical waveguide provided with the adhesive is positioned to a prescribed place of the electric wiring board and stuck thereon, and the sticking method and the conditions thereof are the same as in the first step.

In an example shown in FIG. 1 (d), the optical waveguide provided with the adhesive obtained in the second step is positioned to the electric wiring board having an electric wiring 32 and an electric insulating layer 33 provided, if necessary, on a substrate 31, and then the adhesive layer is cured by a method such as heating and the like to adhere the electric wiring board with the optical waveguide, whereby the electric wiring board 40 provided with the optical waveguide is obtained.

In the production example shown in FIG. 1, an example in which the optical waveguide divided into a prescribed size before peeling off the supporting base material is shown as described above (refer to FIG. 1 (b)), and processing of dividing may be carried out together with the electric wiring board after adhering the optical waveguide to the electric wiring board.

In the above case, an FPC (flexible printed circuit) board can be used for the electric wiring substrate (30 in FIG. 7 (a)) in order to prepare a photoelectric composite substrate of a flexible type having a flexibility. Polyimide, polyamide, polyetherimide, polyethylene terephthalate, liquid crystal polymers and the like are used as a board material (31 in FIG. 1 (d)) for the FPC board, and polyimide is usually used from the viewpoints of a heat resistance and an availability.

Next, the fourth step in the production process of the present invention is a step in which a mirror 51 for converting an optical path is formed on the electric wiring substrate provided with the optical waveguide prepared in the third step (refer to FIG. 1 (e)). A method for forming the mirror includes, for example, methods such as cutting polishing by dicing and the like, abrasion by irradiation with a laser and the like.

Figure 4:
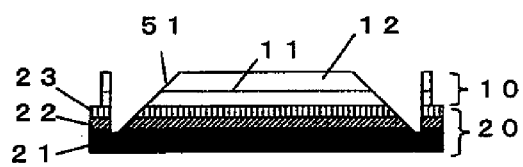
FIG. 4 is a drawing showing a case where a mirror is formed in a step of dividing an optical waveguide.

As described above, the present invention is characterized by forming the mirror after adhering the optical waveguide. In contrast with this, a photoelectric composite substrate having the same structure can be prepared as well by forming the mirror, as shown in FIG. 4, in the step of dividing the optical waveguide described above (refer to FIG. 1 (b)) and adhering it to a prescribed position of the electric wiring substrate, but the mirror position is varied from the prescribed position to a large extent due to a dimensional change brought about by expansion and contraction of the electric wiring substrate, the optical waveguide and the adhesive in curing the adhesive by heating. On the other hand, the production process of the present invention does not bring about the above problem and makes it possible to combine the light-sensitive and emitting element with the optical waveguide at a high accuracy and obtain the high optical coupling efficiency.

In FIG. 1, a case in which the sheet-like adhesive 20 having the pressure-sensitive adhesive layer and the adhesive layer on the supporting base material is used has been explained as the example, and the same step is carried out as well in a case in which the sheet-like adhesive 20' having the pressure-sensitive adhesive and adhesive layer on the supporting base material is used. To be specific, it is the same as the case in which the sheet-like adhesive having the pressure-sensitive adhesive layer and the adhesive layer on the supporting base material is used, except that in the second step (refer to FIG. 5 (c)) in which the optical waveguide provided with the adhesive is prepared, the supporting base material is peeled off from the pressure-sensitive adhesive and adhesive layer at an interface thereof as shown in FIG. 5.

The photoelectric composite substrate 50 produced by the production process of the present invention can readily provide a photoelectric composite module 60 by mounting, as shown in FIG. 1 (f) and FIG. 5 (f), an optical element 61 such as a vertical cavity surface emission laser (VCSEL) or a photodiode.

In the above photoelectric composite module, a light transmission factor of the adhesive layer or the pressure-sensitive adhesive and adhesive layer is important, and the above light transmission factor is preferably 80% or more after curing in order to reduce the optical loss. Further, from the viewpoint of reducing the optical loss, the above light transmission factor is more preferably 85% or more, further preferably 90% or more. In this regard, the light transmission factor is obtained by measuring a prescribed wavelength by means of a spectrophotometer, and it can be measured by means of, for example, a U-3310 spectrophotometer manufactured by Hitachi High-Technologies Corporation.

In a case in which a flexible wiring substrate is used for an electric wiring board to prepare a photoelectric composite substrate, the sheet-like adhesive has to have a flexibility after cured in order to provide the photoelectric composite substrate with a flexibility. If the sheet-like adhesive after cured has an elastic modulus of 700 MPa or less, the sufficiently high flexibility can be exhibited, and it is preferred. From the above viewpoint, the above elastic modulus is more preferably 600 MPa or less, further preferably 500 MPa or less.

On the other hand, from the viewpoint of a strength of the adhesive, an elastic modulus of the sheet-like adhesive after cured is preferably 1 MPa or more, more preferably 50 MPa or more.

The photoelectric composite substrate produced by the present invention is produced, as described above, by using the sheet-like adhesive.

To be more specific, as showing cross-sectional drawings thereof in FIG. 1 (e) and FIG. 5 (e), the optical circuit board provided with the adhesive is adhered, via the adhesive, to a part of the substrate 31 in the electric wiring substrate having the electric wiring 32 and the electric insulating layer 33 provided, if necessary, on the substrate 31, and combination of electric wiring with optical wiring is achieved. In a mode in which light transmits through the substrate as is the case with FIG. 1 (e) and FIG. 5 (e), it is important for reducing a loss thereof that the substrate 31 has a large transmission factor. That is, the substrate has preferably a transmission factor of 80% or more. From the viewpoint of reducing the optical loss, the light transmission factor is more preferably 85% or more, further preferably 90% or more. The above electric wiring substrate includes, for example, an FPC board prepared by using Kapton (manufactured by Du Pont-Toray Co., Ltd.).

Use of the electric wiring substrate having a high light transmission factor makes it unnecessary to provide through-holes on the electric wiring substrate for the purpose of enhancing a light transmission factor. Because of this, processing of the through-holes is omitted, and a core of the optical waveguide to the through-holes and alignment of the electric wiring are unnecessary, so that the preparing steps can be simplified to a large extent. Also, through-holes for transmission of light may be provided, if necessary, at places corresponding to an optical path on the substrate, and the through-holes for transmission of light can be provided by processing according to a method such as drilling, punching, wet etching, dry etching and the like. Further, the above through-holes may be filled with a resin material for the purpose of matching the refractive index and reducing the optical coupling loss.

An example in which the optical waveguide is adhered to one surface of the electric wiring substrate is shown in FIG. 1 and FIG. 5, and optical waveguides 10 may be provided, as shown in FIG. 6, on both surfaces of the electric wiring substrate. The number of the optical wirings in the photoelectric composite substrate can be increased by assuming the above constitution, and a volume of optical transmission can be increased. Further, the structure thereof is vertically symmetry, and therefore the photoelectric composite substrate can be inhibited from being warped.

Further, there may be assumed a structure in which the adhesive layers 23 are provided, as shown in FIG. 7 (a), on both sides of the optical waveguide and in which the electric wiring substrates 30 are provided on both surfaces thereof. A vertically symmetrical structure is obtained by assuming the above constitution, and therefore it becomes possible to inhibit the photoelectric composite substrate from being warped and enhance a flexural resistance thereof. Incidentally, from the viewpoints of inhibiting warping and enhancing the bending resistance, the electric wiring substrates are not necessarily provided on both surfaces, and materials having the same physical properties as those of the electric wiring substrate 30, for example, the base material of the electric wiring substrate and the electric insulating layer may be provided, as shown in FIG. 7 (a), as a cover film 70 on the opposite side of the electric wiring substrate 30.

Further, there may be assumed a structure in which the optical waveguide and the photoelectric composite substrate are provided with a multilayer constitution, and such constitution makes it possible to increase furthermore a capacity of signal transmission.

EXAMPLES

The present invention shall more specifically be explained below with reference to examples, but the present invention shall by no means be restricted by these examples.

Example 1

(1-1) Preparation of an Optical Waveguide

Preparation of a Resin Film for Forming a Cladding Layer:

Weighed into a wide mouth plastic bottle were 48 parts by mass of a phenoxy resin (trade name: Phenotohto YP-70, manufactured by Tohto Kasei Co., Ltd.) as a binder polymer (A), 49.6 parts by mass of alicyclic diepoxycarboxylate (trade name: KRM-2110, molecular weight: 252, manufactured by Asahi Denka Co., Ltd.) as a photopolymerizable compound (B), 2 parts by mass of a triphenylsulfonium hexafluoroantimonate salt (trade name: SP-170, manufactured by Asahi Denka Co., Ltd.) as a photopolymerization initiator (C), 0.4 part by mass of SP-100 (trade name, manufactured by Asahi Denka Co., Ltd.) as a sensitizer and 40 parts by mass of propylene glycol monomethyl ether acetate as an organic solvent, and the mixture was stirred for 6 hours on the conditions of a temperature of 25° C. and a revolution of 400 rpm by means of a mechanical stirrer, a shaft and a propeller to prepare a resin vanish A for forming a cladding layer. Then, the resin vanish was filtrated under pressure through a polyflon filter (trade name: PF020, manufactured by Advantec MFS, Inc.) having a pore diameter of 2 μm on the conditions of a temperature of 25° C. and a pressure of 0.4 MPa, and it was further defoamed under reduced pressure for 15 minutes on the condition of a vacuum degree of 50 mm Hg by means of a vacuum pump and a bell jar.

The resin vanish A for forming a cladding layer obtained above was coated on a corona-treated surface of a polyamide film (trade name: Mictron, thickness: 12 μm, manufactured by Toray Industries, Inc.) by means of a coating machine (Multicoater TM-MC, manufactured by Hirano Tecseed Co., Ltd.), and it was dried at 80° C. for 10 minutes and then at 100° C. for 10 minutes. Thereafter, a release PET film (trade name: Purex A31, thickness: 25 μm, manufactured by Teijin DuPont Films Japan Ltd.) as a protective film was stuck thereon so that a release surface faced the resin side to obtain a resin film for forming a cladding layer. In this case, a thickness of the resin layer could optionally be controlled by controlling a gap of the coating machine, and in the present example, the thickness was controlled so that the film thicknesses after cured were set to 25 μm for the lower cladding layer and 70 μm for the upper cladding layer.

Preparation of a Resin Film for Forming a Core Layer:

A resin vanish B for forming a core layer was prepared by the same method and on the same conditions as in the production example of the resin film for forming a cladding layer described above, except that used were 26 parts by mass of the phenoxy resin (trade name: Phenotohto YP-70, manufactured by Tohto Kasei Co., Ltd.) as the binder polymer (A), 36 parts by mass of 9,9-bis[4-(2-acryloyloxyethoxy)phenyl]fluorene (trade name: A-BPEF, manufactured by Shin-Nakamura Chemical Co., Ltd.) and 36 parts by mass of bisphenol A type epoxy acrylate (trade name: EA-1020, manufactured by Shin-Nakamura Chemical Co., Ltd.) as the photopolymerizable compound (B), 1 part by mass of bis(2,4,6-trimethylbenzoyl)phenylphosphine oxide (trade name: Irgacure 819, manufactured by Ciba Specialty Chemicals K.K) and 1 part by mass of 1-[4-(2-hydroxyethoxy)phenyl]-2-hydroxy-2-methyl-1-propane-1-one (trade name: Irgacure 2959, manufactured by Ciba Specialty Chemicals K.K) as the photopolymerization initiator (C) and 40 parts by mass of propylene glycol monomethyl ether acetate as the organic solvent. Then, the resin vanish was filtrated under pressure and further defoamed under reduced pressure by the same method and on the same conditions as in the production example described above.

The resin vanish B for forming a core layer obtained above was coated on a non-treated surface of a PET film (trade name: COSMO SHINE A1517, thickness: 16 μm, manufactured by Toyobo Co., Ltd.) and dried by the same method as in the production example described above. Then, the release PET film (trade name: Purex A31, thickness: 25 μm, manufactured by Teijin DuPont Films Japan Ltd.) as a protective film was stuck thereon so that a release surface faced the resin side to obtain a resin film for forming a core layer. In the present example, a gap of the coating machine was controlled so that the film thickness after cured was set to 50 μm.

Preparation of an Optical Waveguide:

A preparation method for an optical waveguide shall be explained below while referring to FIG. 8.

The release PET film (Purex A31) which was the protective film of the resin film for forming a lower cladding layer obtained above was peeled off, and the resin film was irradiated with a UV ray (wavelength: 365 nm) at 1 J/cm$^2$ from a resin side (a side reverse to the base material film) by means of a UV ray exposing machine (EXM-1172, manufactured by Orc Manufacturing Co., Ltd.) and then subjected to heat treatment at 80° C. for 10 minutes, whereby a lower cladding layer 82 was formed (refer to FIG. 8 (*a*)).

Next, the resin film for forming a core layer described above was laminated on the above lower cladding layer 82 on the conditions of a pressure of 0.4 MPa, a temperature of 50° C. and a laminating speed of 0.2 m/minute by means of a roll laminator (HLM-1500, manufactured by Hitachi Chemical Techno Plant Co., Ltd.), and then they were vacuumed to 500 Pa or lower by means of a vacuum press laminator (MVLP-500, manufactured by Meiki Co., Ltd.) as a flat plate type laminator. Thereafter, it was heated and adhered by pressing on the conditions of a pressure of 0.4 MPa, a temperature of 50° C. and a pressing time of 30 seconds to form a core layer 83 (refer to FIG. 8 (*b*)).

Next, the resin film was irradiated with a UV ray (wavelength: 365 nm) at 0.6 J/cm$^2$ by means of the UV ray exposing machine described above via a negative type photomask having a width of 50 μm (refer to FIG. 8 (*c*)), and then it was heated at 80° C. for 5 minutes after exposed. Thereafter, the PET film which was the supporting film was peeled off, and a core pattern was developed in a developer (propylene glycol monomethyl ether acetate/N,N-dimethylacetamide=8/2, mass ratio) (refer to FIG. 8 (*d*)). Subsequently, the resin film was washed with a washing liquid (isopropanol) and dried by heating at 100° C. for 10 minutes.

Then, the resin film for forming a cladding layer described above was laminated thereon as an upper cladding layer on the same laminating conditions as described above. Further, both faces thereof were irradiated with a UV ray (wavelength: 365 nm) at 25 J/cm$^2$ in total, and then the resin film was subjected to heat treatment at 160° C. for one hour, whereby an upper cladding layer 87 was formed to prepare a flexible optical waveguide in which the base material film was disposed at an outside thereof (refer to FIG. 8 (*e*)). Further, the above flexible optical waveguide was treated for 24 hours on a high temperature and high humidity condition of 85° C./85% for peeling off the polyamide film to prepare an optical waveguide from which the base material film was removed (refer to FIG. 8 (*f*)).

The refractive indices of the core layer and the cladding layer were measured by means of a prism coupler (Model 2010) manufactured by Metricon Inc. to find that a refractive index of the core layer was 1.584 at a wavelength of 830 nm and that a refractive index of the cladding layer was 1.550. Further, a transmission loss of the optical waveguide prepared was measured by a cutback method (measured waveguide lengths: 10, 5, 3 and 2 cm, incident fiber: GI-50/125 multi-mode fiber (NA=0.20), output fiber: SI-114/125 (NA=0.22)) using 850 nm-VCSEL (FLS-300-01-VCL, manufactured by EXFO Inc.) for a light source and Q82214 manufactured by Advantest Corporation for a photodiode to find that it was 0.05 dB/cm.

(1-2) Preparation of a Sheet-Like Adhesive:

Added and mixed by stirring were 100 parts by mass of HTR-860P-3 (trade name, glycidyl group-containing acryl rubber, molecular weight: 1,000,000, Tg: −7° C., manufactured by Teikoku Chemical Industry Co., Ltd.), 5.4 parts by mass of YDCN-703 (trade name, o-cresol novolak type epoxy resin, epoxy equivalent: 210, manufactured by Tohto Kasei Co., Ltd.), 16.2 parts by mass of YDCN-8170C (trade name, bisphenol F type epoxy resin, epoxy equivalent: 157, manufactured by Tohto Kasei Co., Ltd.), 15.3 parts by mass of Plyophen LF2882 (trade name, bisphenol A novolak resin, manufactured by Dainippon Ink & Chemicals Inc.), 0.1 part by mass of NUCA-189 (trade name, γ-mercaptopropyltrimethoxysilane, manufactured by Nippon Unicar Co., Ltd.), 0.3 part by mass of NUCA-1160 (trade name, γ-ureidopropyltriethoxysilane, manufactured by Nippon Unicar Co., Ltd.), 30 parts by mass of A-DPH (trade name, dipentaerythritol hexaacrylate, manufactured by Shin-Nakamura Chemical Co., Ltd.), 1.5 part by mass of Irgacure 369 (trade name, 2-benzyl-2-dimethylamino-1-(4-morpholinophenyl)-butanone-1-one: I-369, manufactured by Ciba Specialty Chemicals K.K.) and cyclohexanone, and the mixture was deaerated under vacuum. The above adhesive vanish was coated on surface release-treated polyethylene terephthalate (Teijin Tetron film: A-31, manufactured by Teijin Limited) having a thickness of 75 μm, and the film was dried by heating at 80° C. for 30 minutes to obtain a pressure-sensitive adhesive and adhesive sheet. A light transmitting supporting base material (FHF-100, low density polyethylene terephthalate/vinyl acetate/low density polyethylene terephthalate three layer film, manufactured by Thermo Co., Ltd.) having a thickness of 80 μm was laminated on the above pressure-sensitive adhesive and adhesive sheet, whereby prepared was a sheet-like adhesive comprising the protective film (surface release-treated polyethylene terephthalate), the pressure-sensitive adhesive and adhesive layer and the light transmitting supporting base material. A thickness of the pressure-sensitive adhesive and adhesive layer was 10 μm. A thickness of the pressure-sensitive adhesive and adhesive layer was set to 10 μm.

The pressure-sensitive adhesive and adhesive layer of the sheet-like adhesive prepared in the above manner was cured at 160° C. for 1 hour, and a transmission factor thereof was measured by means of a U-3310 UV visible spectrophotometer manufactured by Hitachi High-Technologies Corporation to find that it had a high transmission factor of 95% or more at a wavelength of 850 nm.

The refractive index was measured by means of a prism coupler (Model 2010) manufactured by Metricon Inc. to find that it was 1.505 at a wavelength of 830 nm.

Further, the storage elastic modulus was measured (sample size: length 35 mm, width 5 mm and thickness 80 μm, heating speed: 5° C./minute, frequency: 10 Hz) by means of a dynamic viscoelasticity measuring equipment Solids Analyzer RSAII manufactured by Rheometric Corporation to find that it was 350 MPa at 25° C.

Production of Photoelectric Composite Substrate:

A sheet-like adhesive 20' from which a protective film was peeled off was laminated on a flexible optical waveguide 10 on the conditions of a pressure of 0.4 MPa, a temperature of 50° C. and a laminating speed of 0.2 m/minute by means of the roll laminator (HLM-1500, manufactured by Hitachi Chemical Techno Plant Co., Ltd.) (refer to FIG. 5 (*a*)). Subsequently, the waveguide was processed in a rectangular form (a length: 47.5 mm and a width: 2 mm) by means of a dicing saw (DAD-341, manufactured by DISCO Corporation) (refer to FIG. 5 (*b*)). A supporting base material side thereof was irradiated with a UV ray (365 nm) at 250 mJ/cm$^2$ to reduce an adhesive strength of an interface between the pressure-sensitive adhesive and adhesive layer and the supporting base material, and the supporting base material was peeled off to obtain an optical waveguide provided with an adhesive layer (refer to FIG. 5 (c)).

Next, the optical waveguide provided with an adhesive layer was positioned to a prescribed place of a flexible electric wiring board 30 (length: 48 mm, width: 4 mm, base material: Kapton EN, 25 μm, cupper circuit thickness: 12 μm) having an electric wiring for mounting an optical element by making use of a mask aligner mechanism equipped in a UV ray exposing equipment (MAP-1200-L, manufactured by Dainippon Screen Mfg. Co., Ltd.), and it was temporarily adhered thereto by pressing on the conditions of a pressure of 0.4 MPa, a temperature of 80° C. and a laminating speed of 0.2 m/minute by means of the above roll laminator and then heated at 160° C. for 1 hour in a clean oven to adhere the flexible optical waveguide 10 with the electric wiring board 30, whereby the electric wiring board provided with the optical waveguide 40 was obtained (refer to FIG. 5 (d)).

In this regard, a transmission factor of Kapton EN which was the base material of the flexible electric wiring board 30 was measured by means of the U-3310 spectrophotometer manufactured by Hitachi High-Technologies Corporation to find that it was 85% at a wavelength of 850 nm. An optical loss in transmitting through the electric wiring board was as low as less than 1 dB, and a structure in which through-holes for light transmission were not provided was assumed in the present invention.

Next, a 45 degree mirror for converting optical path 51 was formed on a prescribed place by means of the dicing saw (DAD-341, manufactured by DISCO Corporation) to prepare a photoelectric composite substrate 50 of a flexible type (refer to FIG. 5 (e)). In the above case, a distance between the mirrors at both ends was set to 46 mm. A displacement amount (refer to FIG. 9) of the mirror position in the present example was within 5 μm based on a mark for positioning the mirror position, and the positioning could be carried out at a high accuracy.

Evaluation of Photoelectric Composite Substrate:
Evaluation of Optical Loss:

An optical loss of the photoelectric composite substrate 50 prepared above was measured by the following method to evaluate (1) an optical loss of the flexible optical waveguide, (2) a mirror loss and (3) an excess loss caused by combination. Further, above (1) to (3) were totalized to determine the whole loss. The optical loss was measured by using 850 nm-VCSEL (FLS-300-01-VCL, manufactured by EXFO Inc.) for a light source, Q82214 manufactured by Advantest Corporation for a photodiode, a GI-50/125 multimode fiber (NA=0.20) for an incident fiber and a GI-62.5/125 multimode fiber (NA=0.20) for an output fiber.

(1) Optical Loss of the Flexible Optical Waveguide:

The flexible optical waveguide was diced to a waveguide length of 46 mm which was the same as the distance between the mirrors in the photoelectric composite substrate, and both ends of the waveguide length were cut at 90°. An optical loss (insertion loss) of the above optical waveguide was evaluated by a method shown in FIG. 10 (a). That is, light was input into the flexible optical waveguide 10 from VCSEL through a GI-50/125 multimode fiber 91 to measure the optical loss observed in receiving light in PD through a GI-62.5/125 multimode fiber 92. As a result thereof, an optical loss (insertion loss) of the above optical waveguide was 0.3 dB.

(2) Mirror Loss:

An optical path conversion mirror 51 of 45° was formed at one end of the optical waveguide so that a waveguide length was 46 mm to measure an incident loss in a constitution shown in FIG. 10 (b-I) and an output loss in a constitution shown in FIG. 10 (b-II). As a result thereof, the incident loss was 0.9 dB, and the output loss was 1.0 dB. An optical loss of the optical waveguide in (1) described above was subtracted from the above values to determine the mirror losses, and they were calculated to a mirror incident loss of 0.6 dB and a mirror output loss of 0.7 dB.

(3) Combination Loss:

A sample having a waveguide length of 46 mm obtained by cutting down vertically one mirror of the flexible photoelectric composite substrate 50 as shown in FIG. 10 (c-I) and (c-II) was prepared to measure an optical loss of the photoelectric composite substrate 50. As a result thereof, both of the incident loss shown in FIG. 10 (c-I) and the output loss shown in FIG. 10 (c-II) were 2.0 dB. The incident loss and the output loss which were measured in (2) described above were subtracted from the above value to determine the excess losses caused by combination, and they were calculated to 1.1 dB at the incident side and 1.0 dB at the output side.

The mirror loss in (2) and the excess loss in combination in (3) were totalized to find that both of the optical coupling loss at the incident side and the optical coupling loss at the output side were 1.7 dB. The whole loss of the photoelectric composite substrate was calculated from the total of the optical losses in (1) to (3) described above, that is, the total of an optical waveguide loss of 0.3 dB, a mirror incident loss of 0.6 dB, a mirror output loss of 0.7 dB, an incident side combination loss of 1.1 dB and an output side combination loss of 1.0 dB to find that it was 3.7 dB, and it is a value of a sufficiently low loss.

Evaluation of Optical Signal Transmission:

A 4 ch-VCSEL array 93 (AP-A41-0104-0000, manufactured by AVALON CORPORATION) and a 4 ch-PD array 94 (PDCA04-65, manufactured by Albis Co., Ltd.) (Optical element 61) were mounted, as shown in FIG. 11, on the photoelectric composite substrate 50 prepared above (refer to FIG. 5 (f)) to evaluate the optical signal transmission by means of a pulse pattern generator (MP 1758A, manufactured by Anritsu Corp.) and an oscilloscope (HP83480A, manufactured by Hewlett-Packard Company). To be specific, VCSEL was driven at a speed of 10 Gbps to observe a wave pattern (eye pattern) of a received signal in PD. An observation result shown in FIG. 12 was obtained, and it could be confirmed that an optical signal could be transmitted.

The above flexible photoelectric composite substrate (photoelectric composite module 60) mounted with an optical element was bent by 360° at a curvature radius of 1.5 mm to evaluate optical signal transmission in the same manner. As a result thereof, an eye pattern shown in FIG. 13 was observed, and it could be confirmed that an optical signal could be transmitted at 10 Gbps.

Comparative Example 1

A photoelectric composite substrate was produced in the same manner as in Example 1, except that in Example 1, 45 degree mirrors were formed (refer to FIG. 4) at both ends of the optical waveguide in the step of dividing the optical waveguide (refer to FIG. 5 (b)) and that they were adhered to the flexible wiring board. In the present comparative example, a displacement amount (refer to FIG. 9) of the mirror position was 50 μm or more based on the mirror positioning mark, and the mirror position displacement was large.

INDUSTRIAL APPLICABILITY

According to the present invention, a photoelectric composite substrate can readily be produced, and the photoelectric composite substrate obtained makes it possible to connect light-sensitive and light emitting elements with an optical waveguide at a high accuracy and obtain a high optical coupling efficiency. Accordingly, in high speed and high density signal transmission between electronic devices and between wiring boards, combination of electric wiring and optical wiring can be carried out readily at a high accuracy in a technology of connecting electronic devices and wiring boards with each other by means of light, so-called optical interconnection.

The invention claimed is:

1. A production process for a photoelectric composite substrate, comprising a first step in which an optical waveguide is stuck to a sheet-like adhesive, a second step in which a supporting base material of the above sheet-like adhesive is peeled off to prepare the optical waveguide provided with the adhesive, a third step in which the above optical waveguide provided with the adhesive is adhered to an electric wiring board to prepare the electric wiring board provided with the optical waveguide and a fourth step in which an optical path conversion mirror is formed in the optical waveguide of the above electric wiring board provided with the optical waveguide.

2. A photoelectric composite substrate produced by the production process according to claim 1.

3. A photoelectric composite module produced by using the photoelectric composite substrate according to claim 2.

4. The production process according to claim 1, wherein the fourth step in which the optical path conversion mirror is formed is performed subsequent to the first through third steps.

5. The production process according to claim 1, wherein the sheet-like adhesive includes a pressure-sensitive adhesive layer and an adhesive layer.

6. The production process according to claim 1, wherein the adhesive includes an adhesive composition comprising (a) an epoxy resin, (b) a curing agent for the epoxy resin, and (c) a high polymer compound having a weight-average molecular weight of at least 100,000.

7. The production process according to claim 1, wherein said adhesive has a light transmission factor, after curing, of at least 80%.

* * * * *